R. BARNFATHER.
INFLATING DEVICE.
APPLICATION FILED SEPT. 2, 1913.

1,105,057.

Patented July 28, 1914.

2 SHEETS—SHEET 1.

WITNESSES.
C. H. Fowler
G. Manning

INVENTOR.
Robert Barnfather,
By T. Walter Fowler
atty.

R. BARNFATHER.
INFLATING DEVICE.
APPLICATION FILED SEPT. 2, 1913.
1,105,057.
Patented July 28, 1914.
2 SHEETS—SHEET 2.
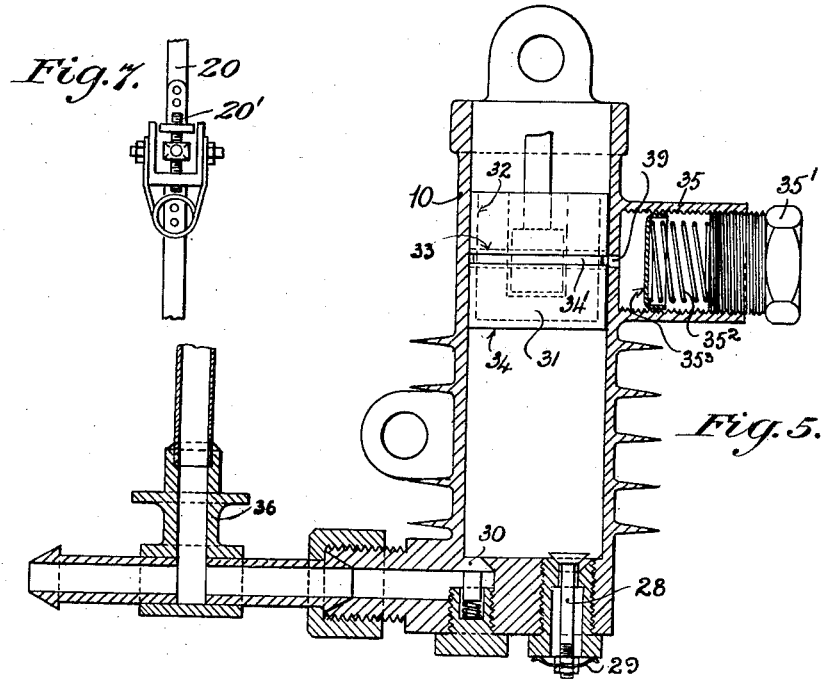
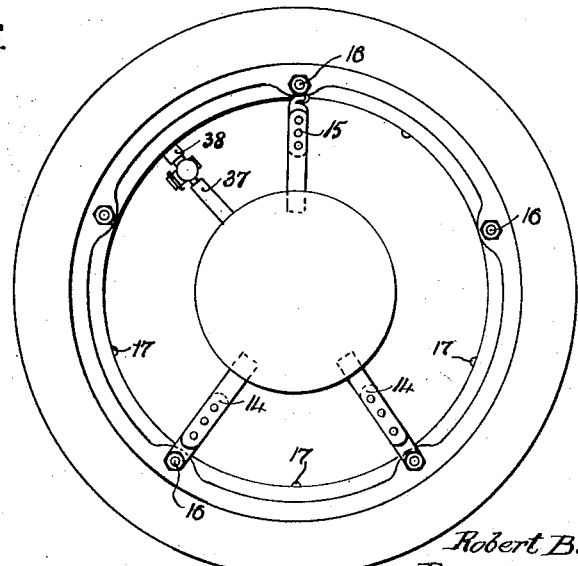
WITNESSES.
C. W. Fowler.
G. Manning.
INVENTOR.
Robert Barnfather.
By T. Walter Fowler
atty

UNITED STATES PATENT OFFICE.

ROBERT BARNFATHER, OF LONDON, ENGLAND.

INFLATING DEVICE.

1,105,057. Specification of Letters Patent. Patented July 28, 1914.

Application filed September 2, 1913. Serial No. 787,676.

*To all whom it may concern:*

Be it known that I, ROBERT BARNFATHER, a subject of the King of England, and residing at London, England, have invented certain new and useful Improvements in Inflating Devices, of which the following is a specification.

This invention relates to inflating devices for the pneumatic tires of road vehicles, and is of the kind adapted to maintain the air pressure within the tire during running in case of a leak or puncture. The inflating device is designed to be attached beside the wheel and controlled by means of a brake acting upon its outer ring or member so as to hold the latter stationary and thereby produce the pumping action through suitable gearing which operates the pump. When the air pressure reaches a predetermined limit, slip occurs between the driving device and the brake, and the speed of the pumps is thus automatically reduced.

The invention is hereafter described with reference to the accompanying drawings, in which:—

Figure 1:
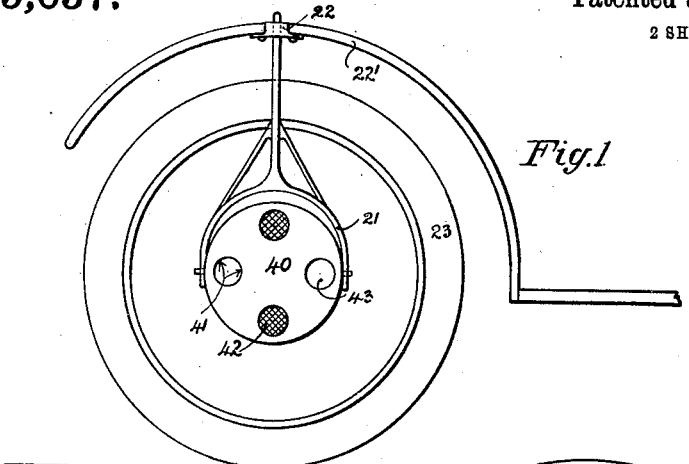
Figure 2:
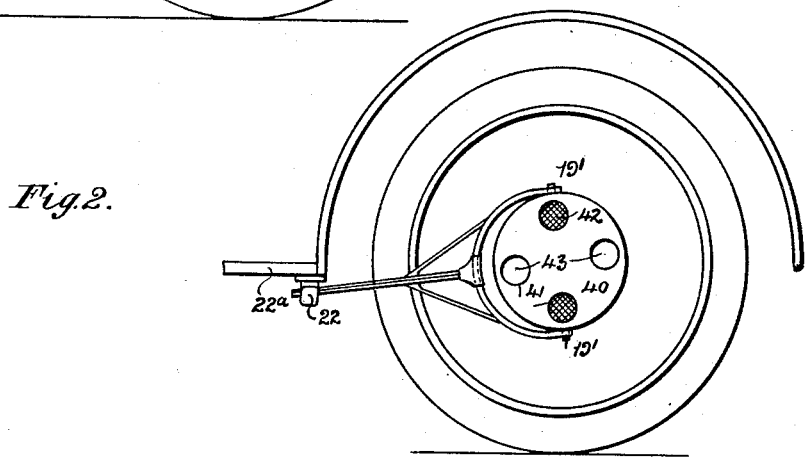
Figure 3:
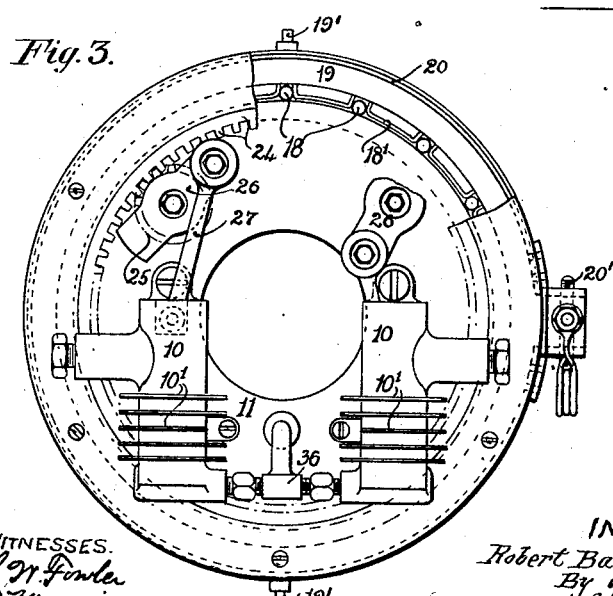
Figure 4:
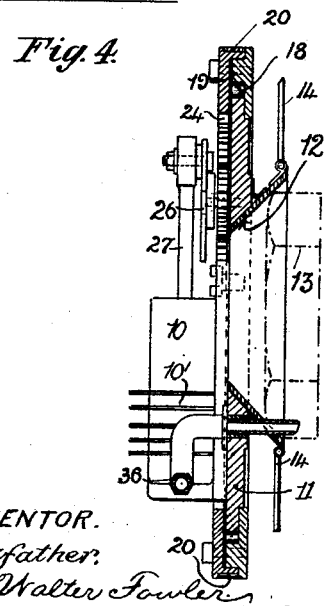

Figure 1 is a side elevation showing the inflating device attached to the front wheel of an automobile. Fig. 2 shows the device attached to the rear wheel of an automobile. Fig. 3 is an enlarged view of the inflating apparatus with cover removed. Fig. 4 is a cross section of the same on line 4—4, showing the funnel device. Fig. 5 is a section of the pump cylinder on a larger scale. Fig. 6 represents the method of anchoring the inflator-support to the tire-rim. Fig. 7 is an end view of the turn-buckle for tensioning the band brake.

The cylinders 10 are mounted side-by-side upon the base plate or frame 11, which is attached when required at the side of the wheel of the vehicle to which the inflator is to be applied. The two cylinders are placed in juxtaposition toward one end of the frame and on opposite sides thereof; they are preferably formed with radiating flanges or ribs $10^1$ to assist in cooling. The frame 11 has at its center a device in the form of a funnel 12 which fits over the projecting hub-cap 13 of the wheel, so as to render the frame self-centering in relation to the wheel. When so fitted the frame is secured by means of three arms 14, the length of which may be adjustable as indicated in the case of the upper arm in Fig. 6, by means of a pin connection 15. The outer extremities of the arms 14 may be secured to the studs 16 which retain the rim, or to the security bolts 17 which hold the tire in place; the arrangement selected will vary according to the kind of tire employed.

Externally of the frame 11 there is mounted upon roller bearings consisting of rollers 18 with interspaced blocks or segments $18^1$, a brake-drum 19 which may be held stationary by means of an encircling band 20, which is contractible and so adjustable by means of a screw connection $20^1$ between the ends of the band. The band is mounted at $19^1$ upon a fork 21, the arm of which in the case of a front steering wheel (see Fig. 1) extends upward through a guide-lug 22 in the frame or bracket of the front mudguard, $22^1$, which guide allows the arm to slide in accordance with the vertical play of the springs and also to twist in accordance with the deflections of the wheel 23 in steering. In the case of a rear driving wheel (see Fig. 2) the arm passes through a guide 22 located at the side of the vehicle for example on the foot board $22^a$.

The rotation of the frame 11 by the movement of the wheel is caused to operate the pump through gearing arranged between said frame and the brake-drum 19 which is held stationary as described. For this purpose internal teeth 24 are formed upon the drum 19 to engage with pinions 25 which operate cranks 26 to which the connecting rods 27 of the pump cylinders are attached. The cranks of the several cylinders are so set that the respective pistons deliver alternately in order to render as continuous as possible the supply of compressed air. Air is admitted to each pump cylinder through a valve 28 controlled by a spring 29 arranged in form of a bow as shown, and the delivery takes place through a second valve 30. The pistons 31 are preferably formed of hollow steel blocks 32 in which the end of the connecting rod bears upon a wrist-pin 33; an outer cap 34 of brass or other suitable bearing metal is driven upon the inner block 32 so as to lock the pin 33 in position. The outer cap is grooved as at 34 and a suitable lubricator 35 is provided upon the wall of the cylinder to communicate through a passage 39 with this groove which latter extends almost around the circumference of the piston.

The compressed air passes from the pumping cylinders to a branched pipe or T-union 36 which forms a common receiving chamber and leads through a flexible pipe 37 to the tire-valve 38 which is of the usual construction. The air pumped in through the valve 38 will therefore act to replace that which is lost by leakage from the damaged tire-cover.

The frame 11 is covered when in use by a lid 40 in which are a number of openings 41 for the admission of air to the pumping cylinders; these openings are fitted with gauzes 42 to prevent the admission of dust and dirt when in use. Inspection doors 43 may also be provided in the cover 40.

It will be noted that in the operation of the device, the band brake is tightened just sufficiently to insure the pumping action. Thus the brake will be always applied to the outer ring 19 so long as the apparatus is in use, but when the air-pressure is raised to a sufficient extent, for example 60 lbs. per square inch, the back pressure against the pump pistons will cause the outer ring 19 to slip on the band-brake; the driving ring will then move slowly around and thereby automatically reduce the speed of the pumps.

Having thus described my invention, what I claim as such and desire to secure by Letters Patent is:—

1. An inflating device, comprising a frame, means for mounting said frame beside a vehicle-wheel, means for attaching said frame to the rim of said wheel by direct connections between said frame and said rim so that the frame is carried by the rim, pump cylinders mounted upon said frame, an outer member revolubly mounted upon said frame, means for retaining said outer member stationary, gearing operated by relative movement of said frame and outer member, cranks driven by said gearing, pistons operated by said cranks and reciprocating in said cylinder, inlet and delivery valves to said cylinders, and means for conveying to the wheel-tire the air compressed in each of said cylinders.

2. An inflating device, comprising a frame, a funnel secured centrally of said frame, said funnel serving to center said frame upon the hub-cap of a wheel, means for attaching said frame to said wheel, and means for effecting the inflation of the wheel-tire by the rotation of said wheel.

3. An inflating device, comprising a frame, means for attaching said frame beside a vehicle wheel, pump cylinders mounted upon said frame, an outer member revolubly mounted upon said frame, a contractible brake band encircling said outer member, an arresting fork upon which said brake band is mounted, an arm upon which said fork is mounted, a guide engaging said arm, and means for operating said pumping cylinders by the relative rotation of said frame and outer member.

4. An inflating device, comprising a frame, means for attaching said frame beside a vehicle wheel, means for connecting said frame to the rim of said wheel so that said frame is carried by said rim, pump cylinders mounted upon said frame, an outer member revolubly mounted upon roller bearings upon said frame, a contractible brake band encircling said outer member, means for holding said brake band stationary, gearing operated by relative movement of said frame and outer member, cranks driven by said gearing, pistons operated by said cranks and reciprocating in said cylinder, said cranks being set at opposite angles, inlet and delivery valves to each of said cylinders, and means for conveying to the wheel-tire the air compressed in said cylinders.

5. An inflating device, comprising a frame, a funnel secured centrally of said frame, said funnel serving to center said frame upon a vehicle-wheel, arms serving to attach said frame to said wheel, means for adjusting the length of said arm, and means for effecting the inflation of the wheel-tire by the rotation of said wheel.

6. An inflating device, comprising a frame, means for attaching said frame beside a vehicle wheel, means for connecting said frame to the rim of said wheel so that said frame is carried by said rim, pump cylinders mounted upon said frame, said cylinders being arranged side by side with their heads in juxtaposition, a stationary outer member upon said frame, gearing between said frame and said outer member, said gearing operated by the rotation of the wheel, pump pistons reciprocating in said cylinders and operated by said gearing, said pistons having opposite strokes, inlet and delivery valves to each of said cylinders, and a T-piece connecting up the deliveries of said cylinders and conveying the compressed air to the wheel-tire.

7. An inflating device, comprising a frame, means for attaching said frame beside a vehicle wheel, direct connections between said frame and said rim so that said frame is carried by said rim, a funnel secured centrally of said frame, said funnel serving to center said frame upon the vehicle wheel, pump-cylinders mounted upon said frame, an outer member revolubly mounted upon roller bearings upon said frame, a contractible brake band encircling said outer member, means for holding said brake-band stationary, said means comprising a fork device engaging pins upon the brake ring, gearing operated by relative movement of said frame and outer member, cranks driven by said gearing, pistons operated by said cranks and reciprocating in said cylinders, inlet and delivery valves to said cylinders, and means for conveying to the wheel-tire the air compressed in said cylinders.

8. An inflating device comprising a frame, means for mounting said frame beside a vehicle wheel, means for attaching said frame to the rim of said wheel, pump cylinders mounted upon said frame, an outer member revolubly mounted upon said frame, means for retaining said outer member stationary, gearing operated by relative movement of said frame and outer member, cranks driven by said gearing, said cranks being set at opposite angles, pistons operated by said cranks and reciprocating in said cylinders, said pistons consisting of steel blocks fitted with renewable outer caps, said caps having circumferential grooves, lubricators upon the walls of said cylinders communicating with said grooves, suction and delivery valves to said cylinders, and means for conveying to the wheel-tire the air compressed in said cylinders.

9. An inflating device comprising a frame, means for attaching said frame beside a vehicle wheel, arms connecting said frame direct to said rim so that said frame is carried by said rim, pump cylinders mounted upon said frame, an outer member revolubly mounted upon said frame, means for normally retaining said outer member stationary, said retaining means comprising a brake device between which and said frame slip occurs when a limit of air-pressure is reached in said pump cylinders, gearing operated by relative movement between said frame and said outer member, pistons operated by said gearing and reciprocating in said cylinders, suction and delivery valves to said cylinders and means for conveying to the wheel-tire the air compressed in said cylinders.

10. An inflating device for the tires of vehicle wheels, comprising a frame, means for directly attaching said frame to the rim of said wheel, so that said frame is carried by said wheel-rim, pump cylinders mounted on said frame, an outer member revolubly mounted on said frame, means for holding said outer member stationary, gearing operated by relative movement of said frame and outer member, cranks driven by said gearing, pistons operated by said cranks and reciprocating in said cylinders and means for conveying to the wheel-tire the air compressed in each of said cylinders.

11. An inflating device comprising a frame, means for attaching said frame beside a vehicle wheel, means for connecting said frame with the rim of said wheel so that said frame is directly carried by said rim, pump cylinders mounted on said frame, means for compressing air in said cylinders, means for conveying to the wheel-tire the air compressed in said cylinders, a cover upon said frame, inspection doors in said cover, air inlets in said cover and gauze coverings to said inlets.

12. An inflating device for the tires of vehicle wheels comprising a frame, means for directly attaching said frame to the rim of said wheel so that said frame is carried by said wheel-rim, pump cylinders mounted on said frame, an outer member revolubly mounted on said frame, means for holding said outer member stationary, gearing operated by relative movement of said frame and outer member, cranks driven by said gearing, pistons operated by said cranks and reciprocating in said cylinders, said pistons having opposite strokes, admission and delivery valves to each of said cylinders and a connection between said cylinders and the valve of said tire.

13. An inflating device for the tires of vehicle wheels, comprising a frame, means for attaching said frame beside a vehicle wheel, means for connecting said frame with the rim of said wheel so that said frame is directly carried by said rim, pump cylinders mounted on said frame, means for compressing air in said cylinders, means for conveying to the wheel-tire the air compressed in said cylinders, and lubricators secured to the walls of said cylinders with intercommunication between the interiors of said cylinders and said lubricator, and comprising spring pressed plates adapted to force lubricant into said cylinder.

14. An inflating device for the tires of vehicle wheels, comprising a frame, means for directly attaching said frame to the rim of said wheel so that said frame is carried by said wheel-rim, pump cylinders mounted on said frame, an outer member revolubly mounted on said frame by means of rollers and interspaced segments, means for holding said outer member stationary, gearing operated by relative movement of said frame and outer member, cranks driven by said gearing, pistons operated by said cranks and reciprocating in said cylinders and means for conveying to the wheel-tire the air compressed in each of said cylinders.

In testimony whereof I have affixed my signature in presence of two witnesses.

ROBERT BARNFATHER.

Witnesses:
VICTOR FALLON FEENY,
ROBERT BARNFATHER, Jr.